United States Patent [19]

Meloy

[11] 3,861,886
[45] Jan. 21, 1975

[54] MATERIAL IDENTIFICATION CODING METHODS AND SYSTEMS

[75] Inventor: Thomas P. Meloy, Reston, Va.
[73] Assignee: Melpar, Inc., Falls Church, Va.
[22] Filed: Sept. 30, 1971
[21] Appl. No.: 185,417

Related U.S. Application Data

[63] Continuation of Ser. No. 775,519, Nov. 13, 1968, abandoned.

[52] U.S. Cl. .......................................... 44/51, 44/59
[51] Int. Cl. ................................................. C10l 1/32
[58] Field of Search .................. 44/51, 59; 252/408

[56] References Cited
UNITED STATES PATENTS

| | | | |
|---|---|---|---|
| 1,787,995 | 1/1931 | Reilly | 44/59 |
| 2,058,774 | 10/1936 | Colligan | 44/59 |
| 2,265,196 | 12/1941 | Reilly | 44/59 |
| 2,657,700 | 11/1953 | Ray | 44/59 |
| 2,927,849 | 3/1960 | Greblick | 44/51 |
| 3,105,747 | 10/1963 | Calhoun et al. | 44/51 |

FOREIGN PATENTS OR APPLICATIONS
702,634  1/1965  Canada .................................. 44/59

Primary Examiner—Daniel E. Wyman
Assistant Examiner—Y. H. Smith
Attorney, Agent, or Firm—Shapiro and Shapiro

[57] ABSTRACT

A liquid such as petroleum oil is marked for future identification by addition to the bulk liquid of particulate matter in the form of one or more coded powders containing particles of the order of one micron in size. The particles are insoluble in the liquid of interest and are added in very small quantity, e.g., one milligram of powder per ton of bulk liquid, which provides approximately 1,000 particles of each of the coded powders per milliliter of liquid. The particles are henceforth carried by the liquid as a substantially integral part thereof, and are thus available at all times to identify the bulk liquid or portion thereof. Accordingly, the addition of the particles or powders is tantamount to tagging the liquid in question.

20 Claims, No Drawings

MATERIAL IDENTIFICATION CODING METHODS AND SYSTEMS

This is a continuation Application of Ser. No. 775,519 filed Nov. 13, 1968, now abandoned.

BACKGROUND OF THE INVENTION

The present invention relates generally to methods for tagging materials for future identification, and more particularly to the determination of source, grade, or other identifying characteristic (form of identity) of materials by addition thereto of minute particulate matter having characteristics selected for entry into an open region or "window" in the n-dimensional space relative to the chemical or physical properties of the liquid.

A variety of methods are presently available for identifying the grade or type or source of a material, after the material has been mined, produced, refined, or otherwise made available for private or public consumption and has been transported from its point of origin toward an ultimate destination. Whether a material can be uniquely identified with respect to its source or origin, depends to a great extent in presently used methods upon whether it is unique in the sense of its particular historical development or formation. That is to say, if the method of identifying origin depends upon some single inherent characteristic or property of the material, and the same characteristic or property is found in identical form in the same or similar materials obtained from widely-separated (in the geographical sense) locations, it is quite apparent that use of the method on such materials will fail to indicate to a certainty the precise point of origin of each. All that can be deduced from the method is the fact that the material in question originated from one of these known locations (assuming it is not a combination of the material obtained from two or more of these locations). A similar situation exists as to the raw or bulk products of two or more producers, where each of these products is identical in respect to the selected identifying characteristic. Under those conditions, one is unable to identify the particular producer from whom the product is derived, by mere resort to that inherent characteristic of the product.

Clearly, this is a significant disadvantage of any origin identification process that relies on identification of a single intrinsic characteristic, although the same process may be suitable for identification of class (e.g., grade or type) of material since these are, in large measure, intrinsic characteristics.

A widely used method of identifying origin of bulk liquids, such as petroleum oil, resides in a procedure akin to (and sometimes termed) fingerprinting, because it examines inherent or natural internal properties of the oil. Hence, this is also a method of intrinsic identification, but instead of relying on a single characteristic of the material in question, a family of characteristics is usually considered. For example, an infrared spectrograph "fingerprint" can be used to subsequently identify the origin of an oil shipment or portion thereof, provided the "fingerprint" undergoes no change or insignificant change between the time it is originally taken and the time the oil batch is sought to be identified. The effectiveness of such a system, however, is less than perfect because wholly natural occurrences, such as evaporation of the liquid, chemical changes occurring in the presence of sunlight, and other normal phenomena, can produce substantial changes in the "fingerprints" of the substance of interest. Spillage of oil accelerates these changes, because a larger surface portion is exposed to the degrading phenomena.

This is not an unimportant consideration in view of the large amount of oily wastes that are being pumped from the bilges of tankers, as well as other sources of oil spillage, both intentional and accidental, causing pollution of seas, lakes, rivers, and beaches. Public attention is focused on this situation upon the occurrence of a spectacular spill, such as the splitting apart of a tanker at sea or in a harbor to spew forth thousands of gallons of petroleum oil. On a continuing basis, however, far more damage occurs as a result of the less publicized oil spills and slicks that result from surreptitious pumping of shipboard tanks, unknown leaks from tanks, pipelines and industrial plants into adjacent or surrounding bodies of water, and accidental dumping of oil and oily wastes from shipboard and shore installations.

Because of the importance of this problem, and a desire by both government and industry to identify the source of petroleum oil which has been spilled, in an effort to assess appropriate damages against the perpetrator and/or to take appropriate measures to prevent reoccurrence of the event, the present specification is directed in great part to examples and descriptive passages involving the identification of source or origin of petroleum products. It is neither intended nor desired, however, that the present invention be limited by such emphasis or examples, for as will become apparent from the remainder of the specification, the invention is applicable to materials of various types and of various natural states (i.e., solids, liquids, gases, aerosols, pulverulent materials, and so forth), and to other identity, such as grade or quality of the material.

Returning now to the discussion of prior art methods of identification, it will be observed from the preceding brief analysis of the infrared "fingerprint" method that such method is frequently incapable of furnishing the desired information because the "fingerprint" itself is not time stable. Another method of identifying materials, usually in terms of grade or type within a specified class, but also applicable to identification of source or origin, involves the addition of tracer materials, such as the introduction of small quantities of soluble chemicals to a liquid of interest. This may be referred to generically as a "tagging" method, or process of extrinsic identification, in contrast to the earlier-mentioned general method which utilized or examined the inherent or intrinsic characteristics and properties of the liquid in the identification thereof and which may therefore be termed a process of intrinsic identification.

Many liquids, again referring for the sake of example to petroleum oil, are capable of altering or modifying added chemicals as a result of the basic nature of the host or mother liquid or of the added chemical itself. Accordingly, it is essential that the added soluble chemical be stable in and compatible with the host liquid, in the sense that it not undergo breakdown or cause breakdown of any natural bonds, and that it not otherwise react with the constituents of the host liquid to be identified. Clearly, the added chemical must not interfere with the function of the host liquid when used for its intended purpose nor suppress the capability of the host liquid to perform that function. While some chemical additives suitable for identifying certain specific liquids have been developed and used, it should be quite apparent that the function of the liquid to be identified plays a major role in this test of suitability, and that the number of potential host liquid batches is overwhelmingly greater than the number of foreseeably suitable chemicals, causing a substantial coding or tagging ambiguity to exist in the first instance.

Radioactive tracers may also be used in an extrinsic identification scheme, but they raise a twofold problem; first, public acceptance, and second, number available. Such additives rate poorly on both counts.

Still another variation of the tagging method is to employ chemical additives that contain materials capable of being activated under neutron bombardment. Here again, however, there arises the problem of coding ambiguity for lack of a sufficient number of additives in comparison with number of liquid batches to be identified.

It has also been suggested in the past that petroleum products such as gasoline, oil, and so forth may be identified by the addition of suitable oil soluble dyestuffs, such as diazo dyes, for distinctively coloring the particular petroleum product. Clearly, however, such an arrangement is unsuitable for a secretive marking of the liquid in question, since color of the liquid is readily discernible, and by use of known techniques may be varied to assume the color of a different type or grade of the same petroleum product. Moreover, a lower grade petroleum product which is to be placed by subterfuge in the stream of commerce as a higher grade product, may be independently colored to provide it with at least the outward appearance, in terms of color, of the higher grade product, such that from the standpoint of appearance alone an inspector or quality control group may be satisfied.

Still another method of identifying liquids has been proposed in the past, in the case of gasoline, by addition to the gasoline or other hydrocarbon liquid of a marking material in the form of a small amount of diazotizable primary aromatic amine which is soluble in the liquid. This does not produce any distinguishable change in outward appearance of the liquid, but the liquid so marked is readily identified by extracting the amine from the liquid with an aqueous liquid, diazotizing the amine, and coupling the diazotized amine with a coupling component to form an azo dyestuff, which is readily recognizable. However, the use of such agents to identify petroleum products does not serve to overcome the disadvantages of the other methods mentioned above since the test for identifying the marking agent is a straightforward one, and if the identity of the marker is unknown in advance, it may be determined very rapidly and thus permit its addition to other products of the same type, but inferior quality, or its use for other masking purposes.

In still another prior art liquid identification method, the liquids to be marked are denatured alcohols, and the marking or tagging is achieved by addition to the liquid of one or more miscible aliphatic diethers having a boiling point of the denatured alcohol composition. While it is contended by the inventor of that method that these aliphatic diethers cannot readily be removed or chemically altered by the usual "cleaning" methods, hence, can serve to clearly identify the original denatured alcohol if any attempt should illegally be made to process it; nevertheless, it is admitted that the additives are, in fact, removable by simple techniques. In any event, such additives will not serve as a general liquid marker.

A more unusual method of identification suggested in the prior art, but one which is suitable for liquids in general, is constituted by the addition to the liquid of small markers, such as letters, initials, or arbitrary symbols of about the same specific gravity of the liquid, so as to remain in suspension therein and to float freely in the pouring of the liquid. These readable characters may be soluble over a long period, or may take on some of the characteristics of the liquid which they are to identify. It is quite apparent, however, that since the characters are readable, and certainly readily identifiable in the specific bulk liquid, they may also be removed very easily therefrom, or added to lower grade liquid products of similar type for purposes of fraudulent misrepresentation to the consumer.

It will be observed that it is characteristic of all of these prior art liquid identification methods that the marker is generally readily detectable by straightforward methods, if not apparent from mere inspection of the liquid in question. On the other hand, in devising a suitable method of tagging a material for future identification, whether the material be liquid or otherwise, it is important that the possibility and ease of removal of the tagging component and the possibility and ease of masking the tagging component be taken into account. For example, if the purpose of the tagging is to permit identity of the source, e.g., the producer or shipper, of a quantity of crude oil, to impose legal sanctions upon the wanton, willful, or negligent spillage of oil that results in pollution of waterways and shore facilities, it is important that the removal of the tagging agent be accomplishable, if at all, only by techniques of a substantial order of difficulty and at substantial expense relative to the cost of the product itself, so that the violator may not avoid or escape detection by withdrawing the tagging agent, which has been added to the oil under the direction or supervision of governmental authorities. Similarly, the addition of adulterating substances should not ordinarily be sufficient to mask the tagging agent or substance.

It is accordingly a principal object of the present invention to provide a tagging and identification method for materials of various type in which the marker or tagging agent for the material of interest is selected to have characteristics conforming to empty spaces or windows in the chemical or physical makeup of that material, is discernible within the host material only upon employment of relatively complex and expensive detection techniques, may include several different components which are known or will be sought by the trained operator, but which require advanced detection techniques normally unavailable to unauthorized parties and completely undesirable to those parties from an economic standpoint.

SUMMARY OF THE INVENTION

Briefly, according to the present invention a sample of the material to be tagged, such as crude oil, is carefully investigated either by a rigorous analysis of its chemical and/or physical properties, or by a consideration of published aspects of its makeup, where known liquid properties are involved, in an attempt to find open spaces or "windows" in its $n$-dimensional space. Such windows are present in all materials and it is only a matter of performing a sufficiently thorough examination to uncover them and to determine which, from a practical standpoint, is the most effective and useful gap to be filled by the tagging or marking particles. In a specific technique, a sample of the bulk liquid is spun in a rotor device or centrifuge, and analyzed in accordance with known techniques to determine its density gradient with a view toward uncovering gaps therein; to permit the addition of one or more groups of particulate matter, each particle of the order of one micron in size, coded to fill or partially fill one or more of these density gradient gaps.

An addition of 10 different batches of particles to the liquid from a choice of 1,000 different batches of identifiable particles, for example, permits the subsequent individual identification of a total of $10^{23}$ samples of the liquid. In terms of the cost of the marking particles, it will be appreciated that very little expense is involved, and it will also be observed that a very small sample of the liquid, e.g., one liter is usually more than sufficient to idenfity the batch. When the liquid is subsequently to be identified by an authorized inspector or other authorized personnel, density gradient techniques are again used on a sample of the bulk liquid to separate the particles in accordance with their respective positions in the gradient spectrum, thence to permit identification of the particles on the basis of color, crystal or skeletal structure, composition, or other physical and chemical properties. Of course, unauthorized parties would be unaware that the original tagging particle selection had been made on the basis of density gradient of a bulk liquid, which is clearly only one of a vast number of analyses that could be run to determine physical and chemical properties of the liquid. Accordingly, identification of the tagging particles and the possibility of masking other liquids of different grades to correspond to the tagged liquid, by other than authorized personnel, is practically unattainable using economically feasible techniques. To the authorized inspector, however, identification of the particles, and thus of the liquid in which they are maintained in suspension, is achieved by use of such detecting means as a microprobe (a relatively expensive device, but nevertheless well within the budget of a central identifying agency); or by neutron activation of the particles; or by autoradiagraph techniques in which a film is placed on a millipore filter, the liquid sample filtered therethrough and the particles identified by orientation; or by other micromineralogical techniques.

It is therefore another object of the present invention to provide a method of identifying liquids, in which micromineralogical particles coded according to naturally-occurring gaps in the chemical or physical makeup of the liquid of interest are added to the liquid such that identification of one or more groups of these alien particles constitutes identification of the liquid itself.

A DESCRIPTION OF SOME PREFERRED METHODS

As previously stated, the concepts, principles, and techniques of the present invention are not restricted to any particular type of material or group of materials, but are suitable for use in tagging substantially any type and form of material for future identification. In particular, however, the ensuing description will primarily be devoted to tagging of liquids generally, including liquids of such diverse composition and form as petroleum products, vegetable oil, and alcoholic beverages, so long as the particulate matter to be added is chemically inert in the host liquid and neither interferes with nor degrades the purpose of that liquid.

Initially, a particular characteristic or property of the liquid of interest is selected for analysis and observation, to determine whether "windows," i.e., gaps are available in its $n$-dimensional makeup suitable for insertion of appropriately coded particules therein. That is to say, substantially all materials contain naturally-occurring particles of one or more forms. Such particles exhibit a number of different physical and chemical properties, being present for example in a range of sizes and specific gravities. Accordingly, they effectively constitute background noise, analogous to that resulting from naturally occurring spurious energy (e.g., from cosmic sources) of various wavelengths within allocated communication channels of the electromagnetic spectrum, which has an undesirable generalized masking effect on the detectable qualities of the added particulate matter. It is extremely desirable, then, that regions or areas within the host material that are free (or relatively so) from this background noise be found (these areas referred to as "windows") to permit commensurate addition of tagging particles in one or more of these normally-existing voids.

For example, a plot of particle density versus particle size for a liquid to be tagged will clearly reveal areas of low or zero concentration of naturally-occurring particles. The additive particles which are to serve as the tagging substance may then be inserted in the latter areas, by techniques which will be described in detail presently. Any physical or chemical property of the liquid may be selected on the basis of a like investigation, and the liquid then coded via its "windows." For example, a sample of the liquid is obtained, and spun rapidly to provide a clear indication of its density gradient; if gaps are present in the gradient characteristics, the particles to be added to the liquid are coded or selected to have density characteristics appropriate to insertion in these gaps. It should be emphasized, however, that as an alternative to locating a naturally occurring window, a "window" may be created within the host material by appropriate selection of characteristics of the particulate matter to be added. For example, the added particles should be of a type not normally occurring in the natural liquid.

The selected particles preferably range in size from approximately 0.1 micron to approximately 500 microns, and are nominally approximately one micron in size. The addition of ten coded powders or groups of particles from one thousand different groups of particles, to a bulk oil shipment, for example, will permit the unique coding of $10^{23}$ batches of liquid, and results in an addition of approximatley one tenth of one milligram of powder per tone of liquid, or an addition of roughly 100 particles, more or less, per milliliter of liquid for each of the ten coded powders. As a practical matter, these are negligible quantities of added particulates from all but an identification or "tagging" standpoint, and up to $10^{-6}$ grams of tagging material per cubic centimeter is preferable.

The particles themselves may be coded on the basis of any of a large number of distinct properties and characteristics, such as shape, size, chemical composition, specific gravity, color, magnetic susceptibility, index of refraction, and so forth; but again, the particular identifying characteristic of the tagging particles must comport with the "windows" in the host material relative to that characteristic of the naturally-occurring particles.

Before describing specific particle materials suitable for use as tagging substances according to my invention, it should be observed that as used throughout this disclosure the term "particles" is intended to include solid matter in minute subdivided form in the 0.01 to 500 micron size range, and of either crystalline or amorphous composition. Furthermore, the particles may be either mineralogical or biological in form. For example, unique shapes have been observed in the skeletal structure of marine animals, such that the skeletons themselves are contemplated as suitable particles in the performance of methods according to my invention.

Additional factors to be considered in the selection of particulate materials are that these materials should (1) be homogeneous, (2) be relatively inexpensive, which implies that they be naturally available in particulate form, or commercially pulverulent at low cost, as well as that the material be relatively cheap in its raw form, and (3) have surface properties suited to the particular application in which they are to be used. With reference to the latter factor, where, for example, the host material is a fluid, the particles should have surface properties admitting of appropriate treatment for particle dispersal, as acceptance of surfactants, or of electrical charge.

A suitable class of materials for the particulate matter is glass since the members of that class possess all the above-mentioned desirable features. For example, most glasses can be characterized as solidified extremely viscous liquids, and in the liquid state (i.e., prior to solidification) can be quite thoroughly mixed to render them homogeneous down to a micron particle size level. The silica base is amenable to surface adherence of surfactants and potential-determining ions. Moreover, glasses are readily produced in micron spherule form by use of existing commercial techniques.

Other suitable classes of materials from which the particles may be formed are the metals and metal alloys, particularly those alloys having a sufficiently wide one-phase region in the phase diagram as to assure homogeneity, as by precipitation from another phase, followed by maintenance at a sufficiently high temperature to homogenize the alloy in the solid state, and finally, quenching. Many metals, however, are not readily reducible to the micron size powder form by common low-cost techniques, and this may render some of these unsuitable, from an economic standpoint, for use as the particulate material. High purity copper may be prepared in particle sizes down to 100 angstroms by chemical precipitation of copper cyanide followed by reduction to copper. While most metal powders of sizes below −325 mesh tend to agglomerate, many of these are nevertheless dispersable by addition of surfactants. Plating is also capable of altering the surface chemistry of metal powders in a desirable manner, and may be accomplished by chemical vapor deposition in a fluidized bed, with precipitation from an aqueous solution.

Ceramic particles may also be used to practice my invention. For example, $Al(OH)_2$, i.e., bohemite, is commercially available in a needle-like form of the order of 100 A. in diameter and 2,000 A. in length. Also, three types of $Al_2O_3$ powder are available from Linde Products, these averaging 3 microns, 1 micron, and 0.3 micron. Such particles may be metallized using various carbonyls. Particles such as $MoS_2$, $ZnS$, $Ag_2S$ are particularly suitable for tagging oil because they are natural lubricants.

Still another class of suitable particle materials is the polymeric bead. Micron-sized polymer beads produced by suspension polymerization are eminently suitable for use in tagging petroleum oils and other high-viscosity liquids, for example, because of their low specific gravity (e.g. 0.8 for TPX polymer) which tends to maintain them in suspension in the oil.

Dispersion of the particles into the liquid creates some problems, but not of insurmountable scope. First of all, the particles used must be insoluble in the liquid to be tagged. It is also essential that a sufficient number of the tagging or marking particles be added to the liquid to permit distinguishability from particles or particulate matter already present in the liquid, which might otherwise tend to produce a significant problem of "noise" (or, more specifically, "signal-to-noise" ratio) in the subsequent identification process. In other words, it is essential that the signal-to-noise ratio encountered in any attempt to detect the added particulates and thus identify the liquid in which they are immersed, be of satisfactory magnitude to prevent masking or virtual "burying" of the signal.

In the specific example of petroleum oils as the host or mother liquid, most of the naturally occurring particles that render the oil opaque are asphaltine micelles, suspended in the fluid as a colloid. In addition, there are many particles in the oil that indicate its biotic origin, as well as particulate fragments from strata through which the oil passed during formation and recovery. From previous considerations, it is apparent that successful tagging of the oil requires circumvention of this background noise by the judicious selection of "windows," and by the addition of a suitable amount of particulate matter in conformance with the chosen window, with a reasonable assurance that it will remain in the dispersed state over a substantial period of time.

For crude oil, determination of density gradient to obtain a plot of particle density versus particle size is the preferred method by which to locate the windows. However, as previously stated, a number of other characteristics or properties of the particles, other than size, are available for selection, as desired. Well known procedures of performing density gradient separations are available to permit detection of particle density differences as small as $10^{-7}$ gram per cubic centimeter. Of the several basic methods of forming a density gradient, the preferred method is that of subjecting the fluid (oil, in this example) to ultracentrifugation whereby increasing density is readily observed with increasing distance from the axis of rotation of the liquid. While the technique has been applied primarily to separation of macromolecules, it is equally applicable to particles. The basic analysis of the ultracentrifuge technique was made by O. Lamm in his derivation of the "continuity equation" (*Arkiv. Mat. Aslron, Fysik* 21B, No. 2, 1929), from which concentration gradient with distance from axis of rotation, and ultimately, the relationship of sedimentation and diffusion coefficients to particle size, may be determined.

Although the purpose of this process at this point is to find suitable windows in the particulate content of the liquid, here on the basis of particle density versus particle size, the identical process may subsequently be used to separate out the tagging particles during the identification portion of the method, i.e., when the tagged liquid is to be identified on the basis of the tagging particles.

Many satisfactory methods of dispersal of the particles in a liquid host material are available in the art, among these being the following. The particles may be dispersed in an emulsifying carrier liquid in which they are insoluble, the carrier liquid used as an intermediary, and the particles dispersed in colloidal suspension in the bulk liquid of interest by ultrasonic techniques. In some instances it may be desirable to add a surfactant or surface active agent to render the particles compatible with the liquid into which they are to be placed. A second method of dispersal of the particles is to mix them directly with the bulk liquid, under pressure, or by diffusion. In any case, the particulate matter must be inert with respect to the liquid or other substance with which it is to be mixed, must be stable in the new environment; and must remain in suspension in colloidal form, to prevent the formation of binary groups. Here again, to insure the maintaince of a colloidal state it may be desirable to coat the particles to render them compatible with the mother liquid and to keep them in suspension therein. When the liquid is to be identified, the particles may then be removed and stripped of this coating for examination of properties of interest.

Similar considerations exist where the host material is in the gaseous or solid (especially powder) form, although the methods of dispersion may differ. Insofar as solid material in particulate form is concerned, for example, the additive or tagging particles are again selected on the basis of "windows" in the host (determined, for example, on the basis of sizes in the continuum of particles in the host material, by microscopic examination of several samples of the host), and a small amount of these tagging particles added by thoroughly mixing the latter into the host particulate substance. In this instance, the mixing must be performed in several steps designed to produce incremental reductions in concentration of the added particles, as a consequence of the small quantity of these tagging particles to be added to the large quantity of host material, e.g., from 0.1 milligram to 1.0 gram per ton.

Of course, it is not essential or critical to the process that such small quantities of additive particulate material be used, but it does provide several advantages. First, in such minute concentrations, there is substantially complete assurance of zero interference with the function of the host material, zero degradation of the host, and near zero likelihood of any harmful effect in the event that the host material is intended for human or animal consumption. Second, the extremely small concentration assures difficulty of assessing and identifying the tagging particles by unauthorized parties where secretive marking of the host material is intended; as where governmental agencies may place supervisory personnel in a commercial plant or facility to conduct the tagging process (with the consent or required cooperation of the owners of that facility, of course), to allow subsequent detection and identification of the produced material and its source, should that material (or other like material, which will also have been tagged, using a different coding of particles) become a pollutant. Third, the cost of tagging a large quantity of material is extremely small in terms of the quantity of the tagging particles required.

Returning to the methods of dispersion, and to dispersion in crude petroleum oil in particular, two problems are encountered where it is expected that the oil, or some portion thereof may come in contact with sea water for an extended period of time, as the result of a spill or intentional pumping from shipboard, for example. First, the particles must be dispersed within a liquid into the oil, and second, they must remain in the oil phase of the liquid in the event of a two phase oil/water system. One suitable material of which the particles may be composed is that produced by suspension polymerization of plastics, resulting in particles of the order of one micron size which may be made into plastosols or organosols. In this stage they are easily dispersed in a hydrocarbon. Another suitable particulate material is glass beads with a silicate matrix, these being readily dispersible in some liquids by the addition of a potential determining ion.

In order to favor the presence of particles in the oil phase of a two-phase oil/water system, the surface of the particles must be oleophilic, i.e., have a strong affinity for oil. Moreover, the particle surface must be chemically stable; hence, any surface modification should be a chemical process rather than a physical process. For organic particles, oil-wettability and water-insolubility are ensured by graft-polymerization of linear, oil-soluble monomers (e.g. vinyl) onto irradiated organic particles (e.g., polystyrene). Inorganic surfaces, such as appear on glass particles, may be rendered oleophilic by chemical treatment with organic silane derivatives. Materials of the general formula $(CH_3)_3Si-Cl$ will chemically combine with the OH of the surface layer.

As previously stated, for the extremely small quantity of tagging particles to be added to the host material, relative to the quantity of the latter, the dispersion process must be carried out in a sequence of steps intended to achieve increments of concentration reduction. For example, if 1 milligram of tagging particles is to be added to a tone of crude oil, roughly a billion-to-one dilution must be made on a volume basis to achieve a concentration of approximately 1,000 particles per milliliter of oil (assuming, for the sake of convenience, that the particles are cubed, one micron on an edge with a specific gravity of 1.0). To this end, the tagging particles, which may be dispersed initially in a hydrocarbon liquid, are continuously fed into a dilution chamber for ultrasonic mixing in a stream of the bulk liquid, to achieve a thousandfold reduction. Another thousandfold reduction of this diluted mixture is produced by metering the latter into another stream of the bulk liquid flowing into a tank, followed by mechanical stirring. Thus, a total dilution of $10^6$ to 1 is achieved in two steps. The third and final step of the dispersion process is another thousandfold reduction in concentration by metering the thus-far tagged bulk liquid into the main flow of the bulk liquid, in a region of high turbulence as ahead of a pump, while the liquid is pumped aboard a tanker, for example.

The subsequent detection and identification of the coded particulate material in a sample of the host material found or taken from a specific location removed from its source, may be accomplished by any of a variety of suitable techniques. The particles, or some of them, may first be detected and removed by a substantial repetition of the "window" analysis and powder addition processes except that when an occupied window is found in the known host material under examination, the tagging particles may or may not be separated therefrom, according to the particular identification technique selected. Identification may be achieved, for example, by use of a conventional micro-probe, wherein an electron beam (with electron energies of about 30 KeV) from a suitable source is focused on area of the order of $10^{-8}$ cm$^2$ (or about 0.5 to 1.0 micron in diameter). If shape of the particulate matter is the characteristic to be examined, the large fraction of electrons backscattered from a particle or particles under examination, together with low-energy secondary electrons produced by beam impact on atoms of the particle, are detected to determine shape of the particulate surface. To this end, the backscatter signal from the electron detector is employed to modulate the brightness of a CRT, creating the impression of observing the particles from the direction of the electron beam at a point coincident with the position of the detector.

The characteristic emission spectrum of the irradiated particle may be observed by measuring the wavelength of the line emissions with the X-ray spectrometer, to provide another means of identification with the micro-probe.

Preferably, however, in the case of tagging of liquids the tagging particles, or some of them, are removed by the use of such conventional techniques as density gradient separation or electrophoretic separation from the host liquid, followed by appropriate state-of-the-art microanalysis techniques. The latter may include the use of a micro-probe as discussed above to determine various characteristics or properties of the particles to produce a positive identification thereof.

As previously stated, the tagging particles may be of various types of material, including mineralogical and biological. They may, for example, be beads composed of metal or polymers identifiable by color, chemical composition, density, size, or other characteristic. They may also be biotic materials derived from an organic source, such as pollens, skeletons of minute animal life, or viable or motile bacterial spores. The latter materials are characterized by distinctive shapes, and in the case of spores, they may be plated out, activated, and grown on suitable substrates for unique identification.

As a specific example of practicing the method of the present invention, a sample of crude oil was tagged with polystyrene beads of 1.035 $\mu$ in diameter in a 10 percent aqueous dispersion. When viewed under a magnification of 400x, the beads are readily observed and identified, and the crude oil specified, according to the characteristics of the beads, namely, their sphericity, uniformity of size, and apparent diameters (at the aforementioned magnification) of about 0.5 millimeters.

The beads were first suspended in an oil-miscible solvent for use as the crude oil tags. The aqueous suspension of polystyrene beads was added to methanol in a centrifuge tube, where it was centrifuged and the supernatant liquid then decanted off. This portion of the process was repeated a sufficient number of times to remove all traces of water. The water-free beads were suspended in hexyl alcohol and added to the crude oil.

In this particular example, identification of the beads was performed directly by microscopic examination, since the beads are easily distinguished from other particulate materials suspended in the crude oil, on the basis of shape and size.

By mixing the tagged oil with an immiscible liquid and centrifuging, the beads are readily concentrated for identification purposes. Using glycerin or water as the immiscible liquid, for example, the beads collect at the interface of that liquid and the oil. Complete separation of the beads from the oil is achieved by selecting an immiscible liquid with a density selected according to the density of the bead. As previously pointed out, the tagging particles, whether polystyrene beads or of any other type, must be insoluble in the dispersion liquid, the host liquid, and the separating liquid (if any).

A concentration of 100 or more tagging particles per milliliter or cubic centimeter of host material has been found suitable to permit carrying out the identification portion of the process. In practice, an amount of particulate material up to one microgram per milliliter of host material is sufficient for tagging purposes and represents a practical limit from an economic standpoint.

In addition, it is within the scope of my invention to tag a material for identification by the use of particulate fingerprints. As was noted earlier, the naturally-occurring infrared "fingerprints" of a material are generally not time stable, and therefore are not suitable for detection and identification of the source of other information relating to the material after substantial exposure to the elements. Nevertheless, in accordance with a further aspect of the present invention, these naturally-occurring fingerprints may be altered or modified to permit such detection or identification, by use of methods such as those that have been described above. Further, it is within the scope of my invention to use the naturally-occurring particulate "fingerprint" of a material as a method of detecting information regarding the material, such as its origin, grade, and so forth. For the latter purpose, a map may be plotted of particle frequency of natural particles in the material, on the basis of particle size versus particle density. This map, then, represents a particulate fingerprint of the material of interest. Other physical and chemical properties of the naturally-occurring particles may, of course, be investigated in place of size and density, to obtain the "fingerprint."

The invention is useful in a number of areas, such as aiding the apprehension of parties who may be polluting coastal or intracoastal waterways by dumpting oil, chemicals, or the like. In the case of dumped oil, for example, any attempt to apprehend the culprit by the Coast Guard or other naval units is very difficult unless the act of dumping itself is observed directly from a Coast Guard vessel or other witnessing craft. Marked in the manner prescribed by the present invention, however, the dumped oil may be sampled many days or weeks later and will still have the identifying particles in colloidal suspension therein, to permit identification of the liquid and its source or distributor.

I claim:

1. A method of tagging and identifying bulk material, which comprises examining said bulk material to determine the presence of micro-particles therein and to determine the properties of such micro-particles, providing each of different batches of said material with a corresponding quantity of micro-particles insoluble in said material, each quantity having properties different from the properties of micro-particles previously determined to be present in the bulk material and also different from the properties of the other quantities, and dispersing the provided micro-particles throughout the corresponding batches in suspension until the provided micro-particle concentration is such that the properties are invisible to the naked eye.

2. A method in accordance with claim 1, wherein the size of said provided micro-particles is of the order of the range from about 0.01 microns to about 500 microns.

3. A method in accordance with claim 1, wherein the size of said provided micro-particles is of the order of 1 micron.

4. A method in accordance with claim 1, wherein the concentration of said provided micro-particles after being dispersed is of the order of the range from about one-tenth milligram to about a gram per ton of said material.

5. A method in accordance with claim 1, wherein the concentration of said provided micro-particles after being dispersed is of the order of 100 particles per milliliter of said material.

6. A method in accordance with claim 1, wherein the concentration of said provided micro-particles after being dispersed is of the order of between $10^{-6}$ and $10^{-7}$ grams per cubic centimeter of said material.

7. A method in accordance with claim 1, wherein said provided micro-particles are inert in said material whereby they do not affect the utilization of said material.

8. A method in accordance with claim 1, wherein the provided micro-particles are spheroids.

9. A method in accordance with claim 1, wherein the provided micro-particles are added to said batches by first adding them to a portion of the corresponding batch in high concentration and then reducing the concentration by dilution with additional batch material.

10. A method in accordance with claim 1, wherein the provided micro-particles are selected from the group consisting of glass, polymer, ceramic, and metal beads.

11. A method in accordance with claim 1, wherein the micro-particles provided in the respective batches have densities uniquely selected for each of the different batches.

12. A method in accordance with claim 1, said properties of the provided micro-particles being selected from the group consisting of shape, size, color, chemical properties, specific gravity, hardness, index of refraction, and birefringency.

13. A method in accordance with claim 1, further comprising later analyzing a portion of at least one of said batches containing said dispersed micro-particles to determine the corresponding properties.

14. A method in accordance with claim 13, wherein the analyzing comprises the preliminary step of concentrating the provided micro-particles from said portion to provide an analysis sample with greatly increased concentration of said provided micro-particles.

15. A method in accordance with claim 13, wherein the said analyzing comprises subjecting said portion to at least one of physical and chemical analyzing steps requiring the use of analytical instruments.

16. A method in accordance with claim 13, wherein the analysis comprises micro-analysis steps.

17. A method in accordance with claim 1, wherein said bulk material is oil.

18. A method in accordance with claim 17, wherein said micro-particles are non-soluble in water and are stable when exposed, in films of oil, to sea water and sunlight for prolonged periods.

19. A method in accordance with claim 18, wherein said provided micro-particles are in colloidal suspension and are oleophylic and hydrophobic to prevent flocculation and settling.

20. A method in accordance with claim 19, wherein said provided micro-particles are rendered oleophylic and hydrophobic by treating them with a surfactant.

* * * * *